United States Patent
Belwafa et al.

(10) Patent No.: US 9,731,677 B1
(45) Date of Patent: Aug. 15, 2017

(54) PASSIVE RESTRAINT SYSTEM

(71) Applicant: Ford Global Technologies, LLC, Dearborn, MI (US)

(72) Inventors: Jamel E. Belwafa, Ann Arbor, MI (US); Douglas John Shooks, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/131,487

(22) Filed: Apr. 18, 2016

(51) Int. Cl.
  *B60R 21/233* (2006.01)
  *B60R 21/205* (2011.01)
  *B60R 21/203* (2006.01)
  *B60R 21/00* (2006.01)
  *B60R 21/231* (2011.01)

(52) U.S. Cl.
  CPC .......... *B60R 21/233* (2013.01); *B60R 21/203* (2013.01); *B60R 21/205* (2013.01); *B60R 2021/006* (2013.01); *B60R 2021/23107* (2013.01); *B60R 2021/23161* (2013.01)

(58) Field of Classification Search
  CPC ... B60R 21/233; B60R 21/205; B60R 21/203; B60R 2021/23107; B60R 2021/006; B60R 2021/23161
  See application file for complete search history.

(56) References Cited

U.S. PATENT DOCUMENTS

| | | | |
|---|---|---|---|
| 5,031,929 A | 7/1991 | Henseler | |
| 6,254,121 B1 | 7/2001 | Fowler et al. | |
| 6,422,597 B1 | 7/2002 | Pinsenschaum et al. | |
| 6,832,778 B2 | 12/2004 | Pinsenschaum et al. | |
| 6,962,363 B2 | 11/2005 | Wang et al. | |
| 7,597,355 B2 | 10/2009 | Williams et al. | |
| 7,628,422 B2 | 12/2009 | Fukawatase et al. | |
| 7,651,130 B2 | 1/2010 | Bauberger | |
| 8,191,925 B2 | 6/2012 | Williams | |
| 9,027,962 B1 | 5/2015 | Jang | |
| 9,150,186 B1 | 10/2015 | Belwafa et al. | |
| 9,162,645 B2 | 10/2015 | Cho et al. | |
| 9,227,587 B1 * | 1/2016 | Belwafa | B60R 21/205 |
| 9,272,684 B1 * | 3/2016 | Keyser | B60R 21/237 |
| 2003/0116845 A1 * | 6/2003 | Bojkov | H01L 24/03 257/738 |
| 2007/0126219 A1 | 6/2007 | Williams | |
| 2008/0073891 A1 | 3/2008 | Rose et al. | |

(Continued)

FOREIGN PATENT DOCUMENTS

| | | |
|---|---|---|
| DE | 10200401369 B4 | 1/2010 |
| EP | 1183170 B1 | 5/2000 |

(Continued)

*Primary Examiner* — Darlene P Condra
(74) *Attorney, Agent, or Firm* — Frank A. MacKenzie; Bejin Bieneman PLC

(57) ABSTRACT

A restraint system includes an instrument panel, a passenger airbag chamber supported by the instrument panel, and a secondary airbag chamber. The passenger airbag chamber is inflatable to an inflated position and in the inflated position includes a rear face spaced from the instrument panel and a side face extending from the rear face toward the instrument panel. The secondary airbag chamber is external to the passenger airbag and, in an inflated position, extends along the side face and the rear face of the passenger airbag chamber.

20 Claims, 7 Drawing Sheets

(56) References Cited

U.S. PATENT DOCUMENTS

| | | |
|---|---|---|
| 2011/0309605 A1 | 12/2011 | Kumagai |
| 2013/0147171 A1 | 6/2013 | Shin et al. |
| 2015/0158452 A1* | 6/2015 | Choi .................... B60R 21/233 280/732 |
| 2015/0166002 A1 | 6/2015 | Fukawatase |
| 2015/0321636 A1 | 11/2015 | Jang |
| 2015/0343986 A1* | 12/2015 | Schneider ............. B60R 21/205 280/729 |
| 2015/0367802 A1 | 12/2015 | Fukawatase et al. |
| 2016/0046254 A1* | 2/2016 | Yamada ................ B60R 21/233 280/729 |
| 2016/0046257 A1* | 2/2016 | Yamada ............. B60R 21/2338 280/729 |
| 2016/0059817 A1* | 3/2016 | Umehara ............. B60R 21/233 280/729 |
| 2016/0298643 A1* | 10/2016 | Gallagher ................ F01D 5/14 |

FOREIGN PATENT DOCUMENTS

| | | |
|---|---|---|
| FR | 2876334 | 4/2014 |
| JP | 2006256508 A | 9/2006 |
| JP | 2010241241 | 10/2010 |
| KR | 1020130083264 | 7/2013 |
| WO | 2015156088 A1 | 10/2015 |

* cited by examiner

PASSIVE RESTRAINT SYSTEM

BACKGROUND

Vehicles, such as automobiles, may include airbags designed to inflate and be impacted by occupants of a front seat during a frontal impact of the vehicle. For example, a driver airbag may be supported by a steering wheel and a passenger airbag may be supported by the instrument panel. The driver airbag may be impacted by an occupant in a driver seat, and the passenger airbag may be impacted by an occupant of a passenger seat during a frontal impact.

During an oblique frontal impact of the vehicle, in certain conditions, a head or upper body of one of the occupants may be urged to slide between the driver and passenger airbags toward the instrument panel. Even during a head-on frontal impact, the momentum of the head or upper body of an occupant may urge the head or upper body to slide across the driver or passenger airbag in between the driver and passenger airbags toward the instrument panel. Furthermore, during any type of vehicle impact, depending on the conditions, the momentum of the head of the occupant may urge the head to twist when contacting the driver or passenger airbag.

DETAILED DESCRIPTION

Figure 1:
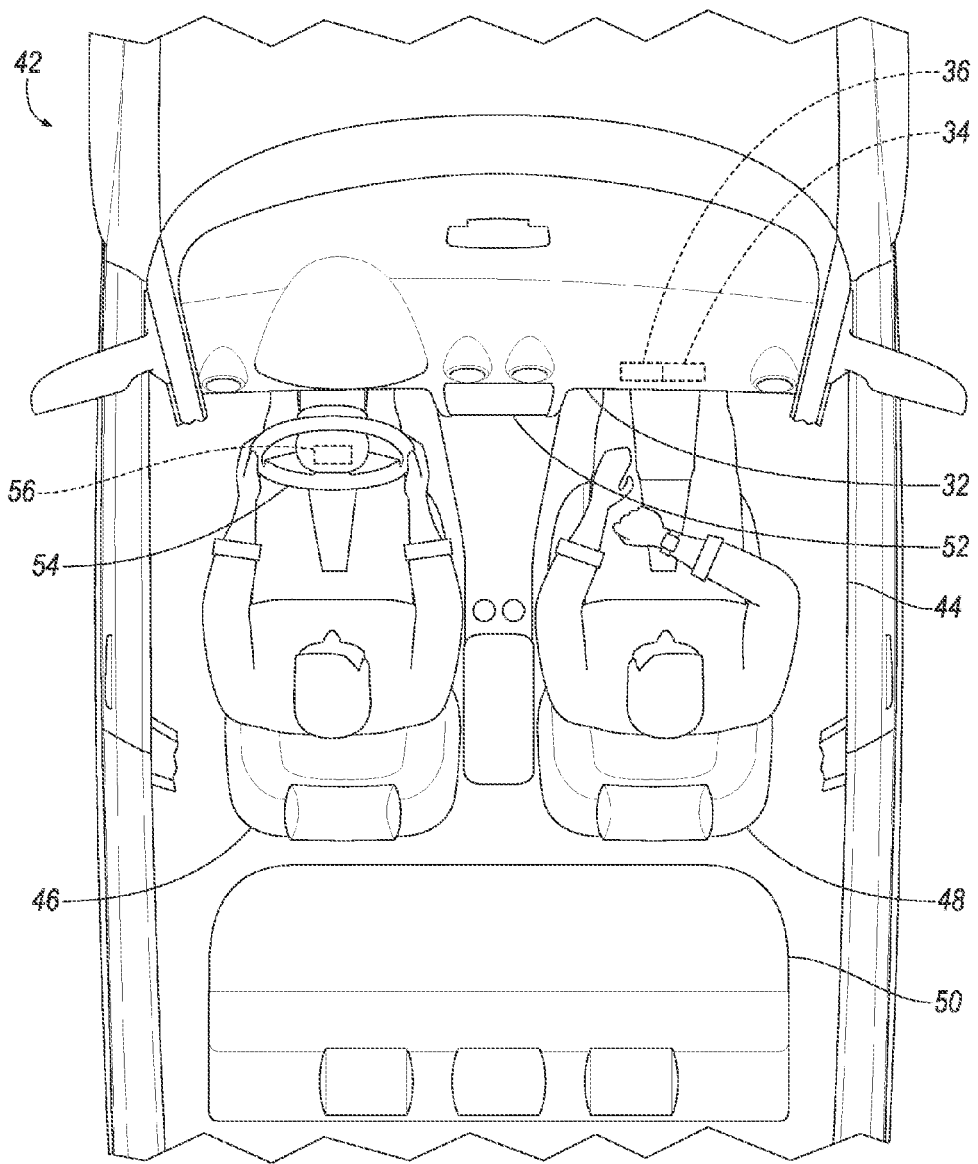
FIG. 1 is a top view of a portion of a passenger cabin of a vehicle.

With reference to the Figures, wherein like numerals indicate like parts throughout the several views, a restraint system 30 for a vehicle 42 includes an instrument panel 32, a passenger airbag chamber 34 supported by the instrument panel 32, and a secondary airbag chamber 36. The passenger airbag chamber 34 is inflatable to an inflated position and in the inflated position includes a rear face 38 spaced from the instrument panel 32 and a side face 40 extending from the rear face 38 toward the instrument panel 32. The secondary airbag chamber 36 is external to the passenger airbag chamber 34 and, in an inflated position, extends along the side face 40 and the rear face 38 of the passenger airbag chamber 34.

The secondary airbag chamber 36 may help prevent an upper body of an occupant (not numbered) from traveling between the passenger airbag chamber 34 and a driver airbag 56 during a vehicle impact, which may thus reduce the likelihood and severity of injury to the occupant. Furthermore, the secondary airbag chamber 36 may help keep a head of the occupant facing forward rather than twisting when contacting the passenger airbag chamber 34.

With reference to FIG. 1, the vehicle 42 may include a passenger cabin 44, and the restraint system 30 may be disposed in the passenger cabin 44. The passenger cabin 44 houses the occupants of the vehicle 42, who may be seated in seats 46, 48, 50, which may include a driver seat 46, a passenger seat 48, and a rear seat 50. The seats 46, 48, 50 may face in a vehicle-forward direction toward the instrument panel 32.

Figure 2:
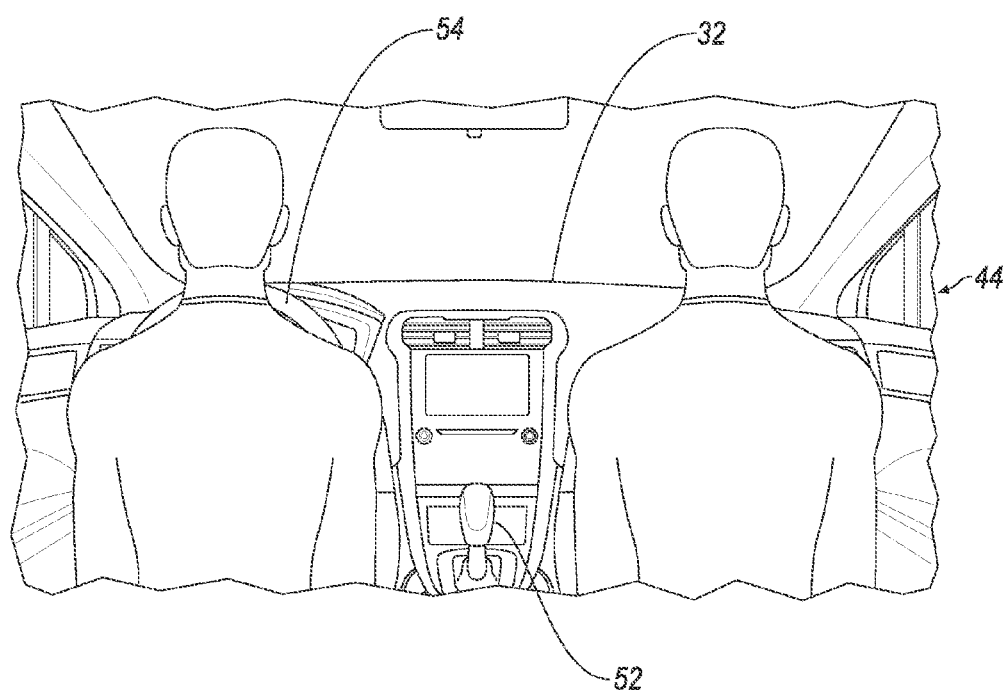
FIG. 2 is a rear view of a portion of the passenger cabin including an instrument panel.

With reference to FIG. 2, the instrument panel 32 may be disposed at a vehicle-forward end of the passenger cabin 44. The instrument panel 32 may include vehicle controls 52, including a steering wheel 54. The instrument panel 32 supports the passenger airbag chamber 34, the secondary airbag chamber 36, and the driver airbag 56. The passenger airbag chamber 34 and the secondary airbag chamber 36, in uninflated positions, are disposed in the instrument panel 32. The driver airbag 56, in an uninflated position, may be disposed in the steering wheel 54. The passenger airbag chamber 34, the secondary airbag chamber 36, and the driver airbag 56 may also be referred to as "passive restraints," i.e., are automatically deployed when a vehicle impact is sensed without input from the occupants, as discussed below.

Figure 3:
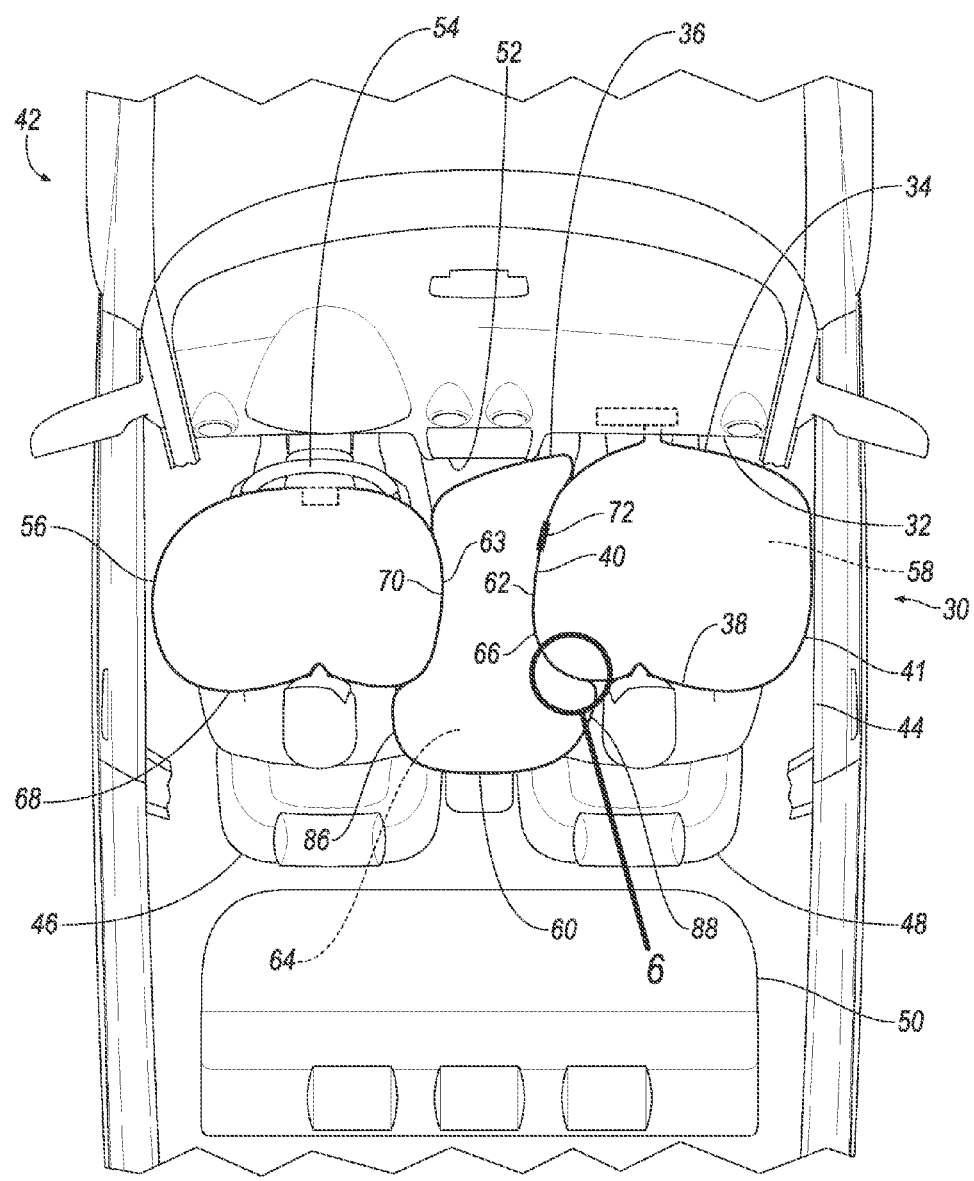
FIG. 3 is the top view of the passenger cabin of FIG. 1 with a driver airbag, a passenger airbag chamber, and a secondary airbag chamber in inflated positions.
Figure 4:
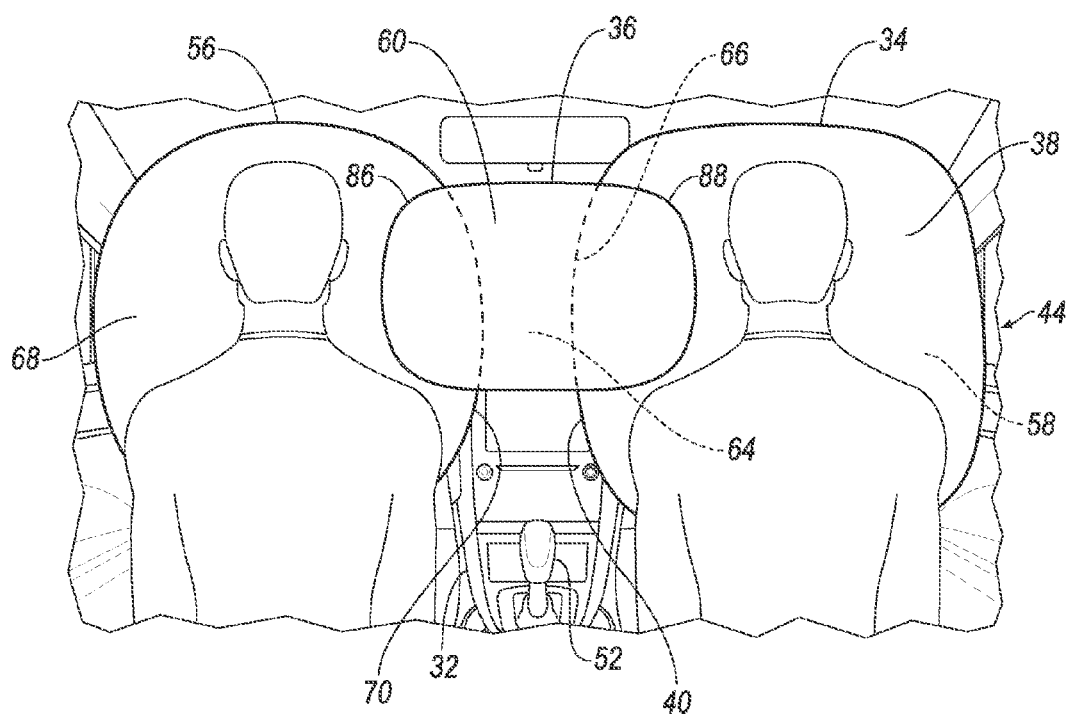
FIG. 4 is the view of the passenger cabin of FIG. 2 with the driver airbag, the passenger airbag chamber, and the secondary airbag chamber in inflated positions.

The passenger airbag chamber 34 is supported by the instrument panel 32 and is inflatable from an uninflated position, as shown in FIGS. 1 and 2, to an inflated position, as shown in FIGS. 3 and 4. The passenger airbag chamber 34 may be disposed in a vehicle-forward direction from the passenger seat 48.

In the inflated position, the passenger airbag chamber 34 includes the rear face 38 spaced from the instrument panel 32, and the side face 40 and a side face 41 each extending from the rear face 38 toward the instrument panel 32, i.e., in the vehicle-forward direction. The rear face 38, side faces 40, 41, and other airbag faces referenced herein may each be a single piece of fabric, part of a single piece of fabric, multiple pieces of fabric sewn together, or a combination. The side faces 40, 41 may be spaced from each other, and the rear face 38 may extend from the side face 40 to the side face 41 in the inflated position. The rear face 38 may also be referred to as the "impact surface 38," i.e., may be designed to initially receive the occupant during a vehicle impact. The rear face 38 and the side face 40 may at least partially define an inflation chamber 58. The inflation chamber 58 may receive inflatable medium, as set forth further below.

With reference to FIGS. 3 and 4, the secondary airbag chamber 36 is external to the passenger airbag chamber 34 and is inflatable from an uninflated position to an inflated position. The secondary airbag chamber 36 includes a rear face 60 spaced from the instrument panel 32 and may include a side face 62 and a side face 63 each extending from the rear face 60 toward the instrument panel 32, i.e., in the vehicle-forward direction. The side faces 62, 63 may be spaced from each other and the rear face 60 may extend from the side face 62 to the side face 63 in the inflated position. The rear face 60 may also be referred to as the "impact surface 60," i.e., may be designed to initially receive the occupant during a vehicle impact.

The rear face 60 of the secondary airbag chamber 36 may be spaced from the instrument panel 32 farther than the rear face 38 of the passenger airbag chamber 34 and/or than the driver airbag 56 in the inflated positions. The secondary airbag chamber 36 includes an inflation chamber 64. The rear face 60 and the side face 62 of the secondary airbag chamber 36 may at least partially define the inflation chamber 64.

With reference to FIG. 3, in the inflated position, the secondary airbag chamber 36 extends along the side face 40 and the rear face 38 of the passenger airbag chamber 34. In other words, the secondary airbag chamber 36 in the inflated position borders at least a portion of the side face 40 and at least a portion of the rear face 38 of the passenger airbag chamber 34.

Figure 6A:
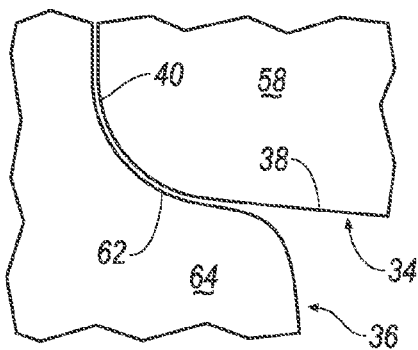
FIGS. 6A-F are views of a portion of the boundary between the passenger airbag chamber and the secondary airbag chamber shown in area 6 as identified in FIG. 3.
Figure 6B:
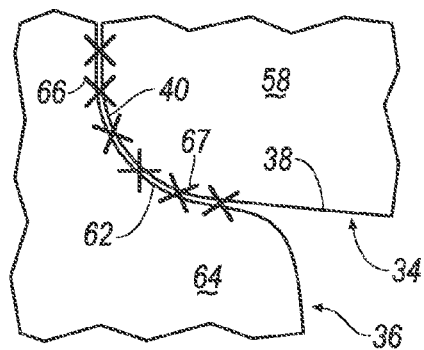
Figure 6C:
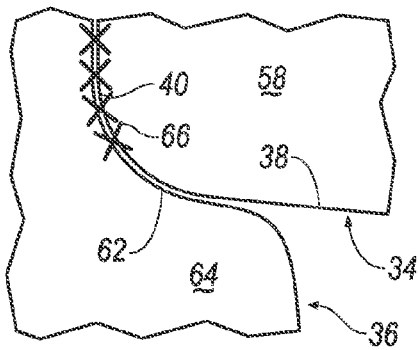
Figure 6D:
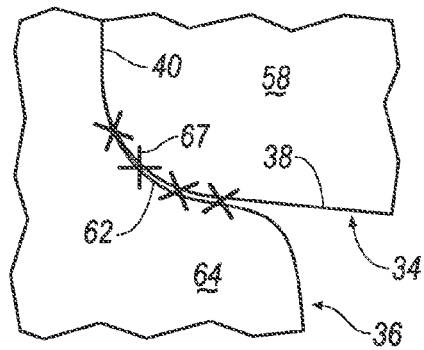
Figure 6E:
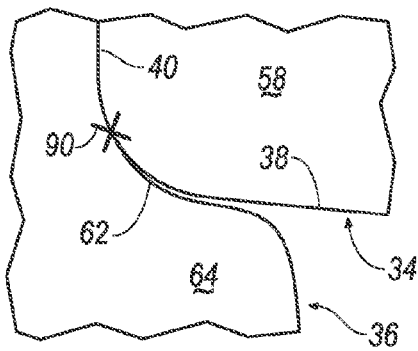
Figure 6F:
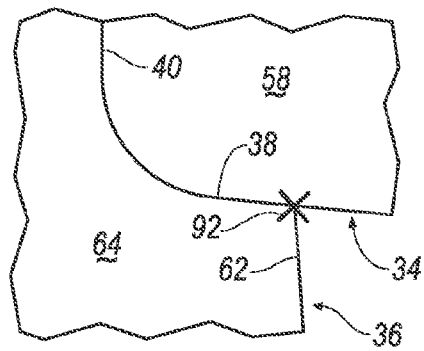

With reference to FIGS. 6A-F, the secondary airbag chamber 36 borders at least a portion of the side face 40 of the passenger airbag chamber 34. As one example, the secondary airbag chamber 36 may include the side face 62 abutting the side face 40 of the passenger airbag chamber 34, as shown in FIGS. 6A-C. The side face 62 of the secondary airbag chamber 36 may be disconnected from the side face 40 of the passenger airbag chamber 34, as shown in FIG. 6A. In other words, with reference to FIG. 6A, the side face 62 of the secondary airbag chamber 36 may abut the side face 40 of the passenger airbag chamber 34 during inflation. Alternatively, stitching 66 may attach the side face 62 of the secondary airbag chamber 36 to the side face 40 of the passenger airbag chamber 34, as shown in FIGS. 6B-C. As another example, the inflation chambers 58, 64 of the passenger airbag chamber 34 and the secondary airbag chamber 36 may each be defined in part by the side face 40 of the passenger airbag chamber 34, as shown in FIGS. 6D-F. In other words, the secondary airbag chamber 36 and the passenger airbag chamber 34 may share the side face 40 of the passenger airbag chamber 34.

With continued reference to FIGS. 6A-6F, the secondary airbag chamber 36 borders at least a portion of the rear face 38 of the passenger airbag chamber 34. As one example, the secondary airbag chamber 36 may include the side face 62 abutting the rear face 38 of the passenger airbag chamber 34, as shown in FIGS. 6A-E. The side face 62 of the secondary airbag chamber 36 may be disconnected from the rear face 38 of the passenger airbag 34, as shown in FIGS. 6A, 6C, and 6E. In the configuration shown in FIG. 6E, stitching 90 connects a back edge of the side face 62 of the secondary airbag chamber 36 to the passenger airbag chamber 34. Alternatively, stitching 67 may attach the side face 62 of the secondary airbag chamber 36 to the rear face 38 of the passenger airbag chamber 34, as shown in FIGS. 6B and 6D. As another example, the inflation chambers 58, 64 of the passenger airbag chamber 34 and the secondary airbag chamber 36 may each be defined in part by the rear face 38 of the passenger airbag chamber 34, as shown in FIG. 6F. In other words, the secondary airbag chamber 36 and the rear airbag chamber may share the rear face 38 of the passenger airbag chamber 34. In the configuration shown in FIG. 6F, stitching 92 may attach a back edge of the side face 62 of the secondary airbag chamber 36 to the passenger airbag chamber 34.

Figure 7:
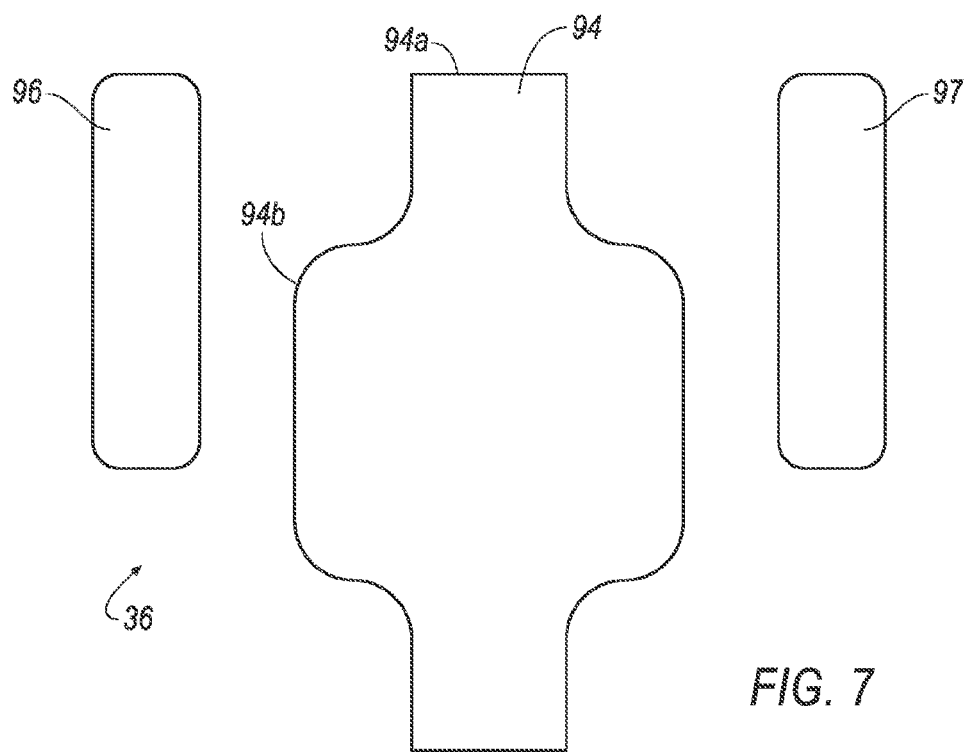
FIG. 7 is an exploded view of panels of the secondary airbag chamber.
Figure 8:
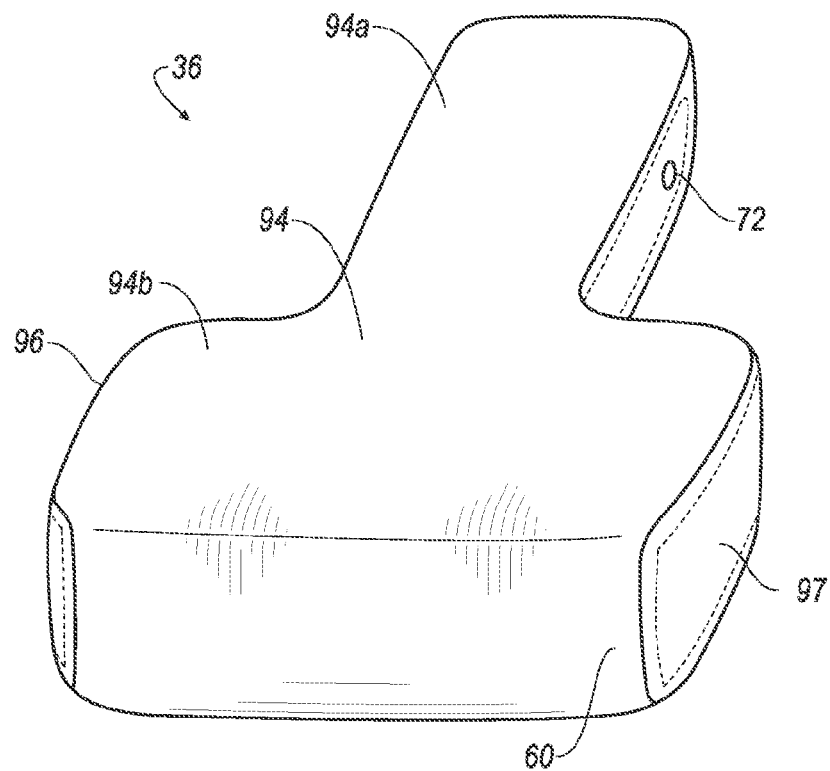
FIG. 8 is a perspective view of the secondary airbag chamber in the inflated position.

With reference to FIGS. 7 and 8, the secondary airbag chamber 36 may include a center panel 94 and a pair of side panels 96, 97. The side panels 96, 97 may be attached to the center panel 94 via, e.g., stitching, adhesives, etc.

The center panel 94 may include a base 94a and a pair of legs 94b. The legs 94b may be spaced from each other and may extend from the base 94a in a common direction in the inflated position; that is, the base 94a and legs 94b may form a U-shape when the secondary airbag chamber 36 is in the inflated position. The base 94a may extend rearward relative to the instrument panel 32 when the secondary airbag chamber 36 is in the inflated position. The rear face 60 of the secondary airbag chamber 36 may be disposed in the middle of the base 94a of the center panel 94.

The side panels 96, 97 may each be connected to the center panel 94 along the base 94a and the two legs 94b. In other words, the side panels 96, 97 may extend to enclose the open sides of the U-shape formed by the base 94a and legs 94b of the center panel 94; thus, the secondary airbag chamber 36 may be formed with only three panels (i.e., the center panel 94a and two side panels 96, 97). The side panel 97 may extend along the side face 40 of the passenger airbag chamber 34, along a portion of the rear face 38 of the passenger airbag chamber 34, and to the rear face 60 of the secondary airbag chamber 36; or only along the rear face 38 of the passenger airbag chamber 34 and to the rear face 60 of the secondary airbag chamber 34; or only from the rear face 38 of the passenger airbag chamber 34 to the rear face 60 of the secondary airbag chamber 36, depending on whether the inflation chambers 58, 64 of the passenger and secondary airbag chambers 34, 36 are defined in part by the side face 40 and/or the rear face 38 of the passenger airbag chamber 34. The side panels 96, 97 may have the same longitudinal length, or the side panel 96 may have a greater longitudinal length than the side panel 97. Said differently, the side panel 97 may thus be similar in size to the side panel 96, as shown in FIG. 7, or may be considerably shorter than the side panel 96 (not shown). This configuration may simplify design and manufacture of the secondary airbag chamber 36 by minimizing the seams between panels.

With reference to FIGS. 3 and 4, the driver airbag 56 may be supported by the instrument panel 32. Specifically, the driver airbag 56 may be coupled to the steering wheel 54 supported by the instrument panel 32. The driver airbag 56 may be inflatable from an uninflated position to an inflated position. The driver airbag 56 may include a rear face 68 spaced from the instrument panel 32 and a side face 70 extending from the rear face 68 toward the instrument panel 32. The rear face 60 of the secondary airbag chamber 36 may be spaced from the instrument panel 32 farther than the rear face 68 of the driver airbag 56.

With reference to FIG. 3, the secondary airbag chamber 36 may extend along the side face 70 and the rear face 68 of the driver airbag 56. In other words, the secondary airbag chamber 36 in the inflated position borders at least a portion of the side face 70 and the rear face 68 of the driver airbag 56. In this configuration where the secondary airbag chamber 36 extends along the side face 40 and rear face 38 of the passenger airbag chamber 34 and the side face 70 and rear face 68 of the driver airbag 56, the secondary airbag chamber 36 may have a mushroom-shaped silhouette in the inflated position as seen from a top view. Said differently, in the inflated position, the secondary airbag chamber 36 may include a left extension 86 abutting the rear face 68 of the driver airbag 56, and a right extension 88 abutting the rear face of the 38 of the passenger airbag chamber 34, as shown in FIGS. 3 and 4. In the inflated position, the driver airbag 56 may be in the vehicle-forward direction relative to the left extension 86, and the passenger airbag chamber 34 may be in the vehicle-forward direction relative to the right extension 88.

The passenger airbag chamber 34, secondary airbag chamber 36, and driver airbag 56 may be formed of any suitable airbag material, for example, a woven polymer. For example, the passenger airbag chamber 34, secondary airbag chamber 36, and driver airbag 56 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane. The passenger airbag chamber 34, secondary airbag chamber 36, and driver airbag 56 may all be formed of the same material or may be formed of different materials.

With continued reference to FIG. 3, the inflation chamber 58 of the passenger airbag chamber 34 may be in communication with the inflation chamber 64 of the secondary airbag chamber 36 through a vent 72 (or vents 72). The vent 72 connecting the passenger airbag chamber 34 and the secondary airbag chamber 36 may be an open vent, a one-way vent, a two-way vent, or an active vent.

Figure 5:
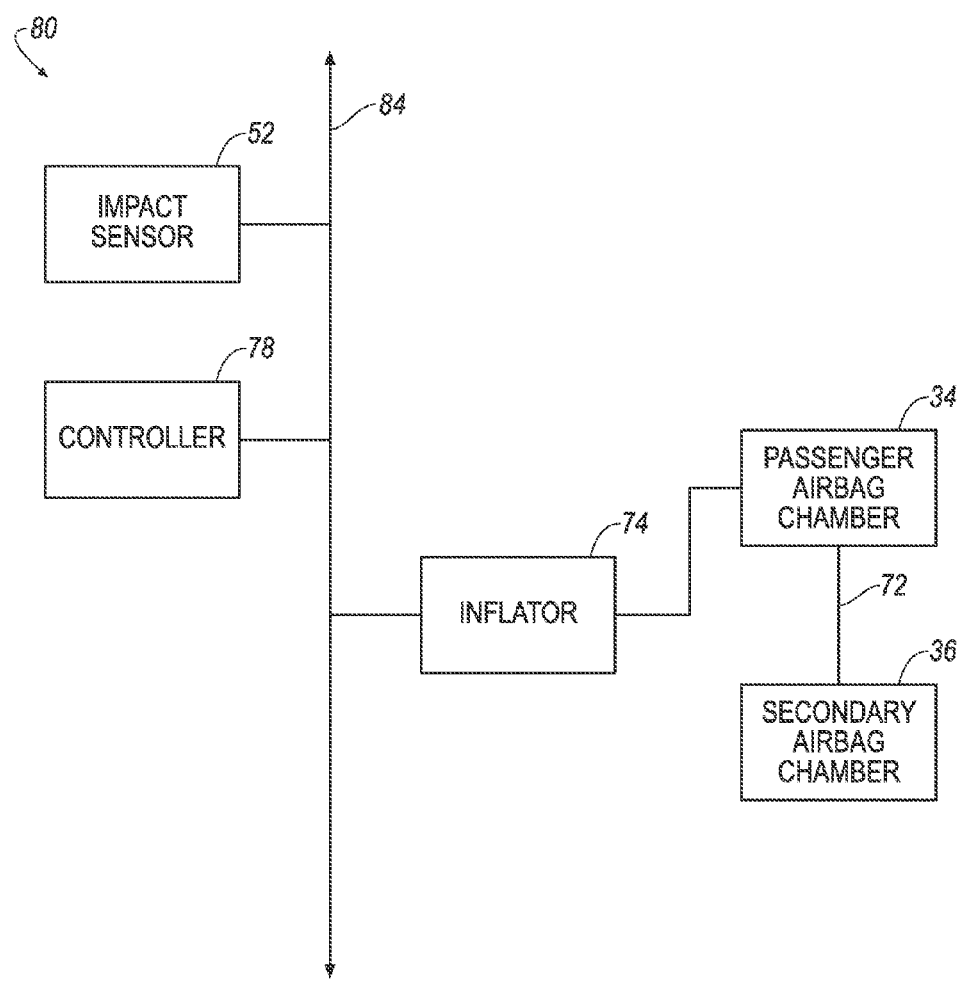
FIG. 5 is a block diagram of a control system.

With reference to FIG. 5, an inflator 74 is in communication with the passenger airbag chamber 34. The inflator 74 may be in communication with both the passenger and secondary airbag chambers 34, 36. Alternatively, a second inflator 76 may be in communication with the secondary airbag chamber 36 (not shown). Upon receiving a signal from, e.g., a controller 78, the inflator 74 or inflators 74, 76 may inflate the passenger and secondary airbag chambers 34, 36 with an inflatable medium, such as a gas. The inflator 74 or inflators 74, 76 may be, for example, a pyrotechnic inflator that uses a chemical reaction to drive inflation medium to the passenger and secondary airbag chambers 34, 36. The inflator 74 may be of any suitable type, for example, a cold-gas inflator.

A control system 80 may include the controller 78 in communication with the inflator 74 or inflators 74, 76 and/or an impact sensor 82. The controller 78, the inflator 74 or inflators 74, 76, and the impact sensor 82 may communicate through a communications network 84.

The controller 78 may be a microprocessor-based controller. The controller 78 may include a processor, memory, etc. The memory of the controller 78 may store instructions executable by the processor.

The impact sensor 82 may be in communication with the controller 78. The impact sensor 82 is adapted to detect an impact to the vehicle 42. The sensor 82 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The sensor 82 may be located at numerous points in or on the vehicle 42.

The control system 80 may transmit signals through a communications network 84 (such as a controller area network (CAN) bus), Ethernet, and/or by any other wired or wireless communications network.

In the event of an impact to the vehicle 42, the impact sensor 82 may detect the impact and transmit a signal through the communications network 84 to the controller 78. The controller 78 may transmit a signal through the communications network 84 to the inflator 74 or inflators 74, 76. The inflator 74 or inflators 74, 76 may discharge, propelling inflatable medium into the inflation chambers 58, 64 of the passenger airbag chamber 34 and the secondary airbag chamber 36. The driver airbag 56 may also be inflated. Upper bodies of occupants of the driver seat 46 and/or the passenger seat 48 may be pushed forward by momentum. The driver airbag 56 may provide cushioning to an occupant of the driver seat 46, and the passenger airbag may provide cushioning to an occupant of the passenger seat 48. If the momentum of the upper body of the occupant of the passenger seat 48 pushes the occupant toward the middle of the vehicle 42 as well as forward, then the secondary airbag may prevent the occupant from traveling between the passenger airbag chamber 34 and the driver airbag 56 and possibly into the instrument panel 32. Likewise, if the momentum of the upper body of the occupant of the driver seat 46 pushes the occupant toward the middle of the vehicle 42 as well as forward, then the secondary airbag may prevent the occupant from traveling between the driver airbag 56 and the passenger airbag chamber 34 and possibly into the instrument panel 32. The secondary airbag chamber 36 may also prevent or reduce twisting of a head of the occupant of the driver seat 46 or the passenger seat 48.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   an instrument panel;
   a passenger airbag chamber supported by the instrument panel and inflatable to an inflated position, including in the inflated position a rear face spaced from the instrument panel and a side face extending from the rear face toward the instrument panel;
   a secondary airbag chamber external to the passenger airbag chamber and, in an inflated position, extending along the side face and the rear face; and
   a driver airbag supported by the instrument panel and inflatable to an inflated position;
   wherein the driver airbag includes a rear face spaced from the instrument panel and a side face extending from the rear face toward the instrument panel, and the secondary airbag chamber extends along the side face and the rear face of the driver airbag.

2. The restraint system of claim 1, wherein the secondary airbag chamber includes a side face abutting the side face of the passenger airbag chamber.

3. The restraint system of claim 2, wherein the side face of the secondary airbag chamber is disconnected from the side face of the passenger airbag chamber.

4. The restraint system of claim 2, further comprising stitching attaching the side face of the secondary airbag chamber to the side face of the passenger airbag chamber.

5. The restraint system of claim 4, further comprising stitching attaching the side face of the secondary airbag chamber to the rear face of the passenger airbag chamber.

6. The restraint system of claim 4, wherein the side face of the secondary airbag chamber is disconnected from the rear face of the passenger airbag chamber.

7. The restraint system of claim 1, wherein the passenger airbag and the secondary airbag chamber each includes an inflation chamber, and wherein the inflation chambers of the passenger airbag chamber and the secondary airbag chamber are each defined in part by the side face of the passenger airbag chamber.

8. The restraint system of claim 7, wherein the secondary airbag chamber includes a side face abutting the rear face of the passenger airbag chamber.

9. The restraint system of claim 8, further comprising stitching attaching the side face of the secondary airbag chamber to the rear face of the passenger airbag chamber.

10. The restraint system of claim 8, wherein the side face of the secondary airbag chamber is disconnected from the rear face of the passenger airbag chamber.

11. The restraint system of claim 7, wherein the inflation chambers of the passenger airbag chamber and the secondary airbag chamber are each defined in part by the rear face of the passenger airbag chamber.

12. The restraint system of claim 1, wherein the secondary airbag chamber includes a rear face spaced from the instrument panel, the rear face of the secondary airbag chamber being spaced from the instrument panel farther than the rear face of the passenger airbag chamber.

13. The restraint system of claim 1, further comprising at least one vent connecting the passenger and secondary airbag chambers.

14. The restraint system of claim 1, further comprising an inflator in communication with the passenger airbag chamber.

15. The restraint system of claim 1, further comprising an inflator in communication with both the passenger and secondary airbag chambers.

16. The restraint system of claim 1, further comprising a first inflator in communication with the passenger airbag chamber and a second inflator in communication with the secondary airbag chamber.

17. The restraint system of claim 1, wherein the driver airbag is coupled to a steering wheel supported by the instrument panel.

18. The restraint system of claim 1, wherein the secondary airbag chamber includes a rear face spaced from the instrument panel, the driver airbag includes a rear face spaced from the instrument panel, and the rear face of the secondary airbag chamber is spaced from the instrument panel farther than the rear face of the driver airbag.

19. A restraint system comprising:
an instrument panel;
a passenger airbag chamber supported by the instrument panel and inflatable to an inflated position, including in the inflated position a rear face spaced from the instrument panel and a side face extending from the rear face toward the instrument panel;
a secondary airbag chamber external to the passenger airbag chamber and, in an inflated position, extending along the side face and the rear face, wherein the secondary airbag chamber includes a side face abutting the side face of the passenger airbag chamber; and
stitching attaching the side face of the secondary airbag chamber to the side face of the passenger airbag chamber;
wherein the side face of the secondary airbag chamber is disconnected from the rear face of the passenger airbag chamber.

20. A restraint system comprising:
an instrument panel;
a passenger airbag chamber supported by the instrument panel and inflatable to an inflated position, including in the inflated position a rear face spaced from the instrument panel and a side face extending from the rear face toward the instrument panel; and
a secondary airbag chamber external to the passenger airbag chamber and, in an inflated position, extending along the side face and the rear face;
wherein the passenger airbag and the secondary airbag chamber each includes an inflation chamber;
the inflation chambers of the passenger airbag chamber and the secondary airbag chamber are each defined in part by the side face of the passenger airbag chamber;
the secondary airbag chamber includes a side face abutting the rear face of the passenger airbag chamber; and
the side face of the secondary airbag chamber is disconnected from the rear face of the passenger airbag chamber.

* * * * *